US012002345B2

(12) United States Patent
Soppin et al.

(10) Patent No.: US 12,002,345 B2
(45) Date of Patent: Jun. 4, 2024

(54) ENVIRONMENT-BASED-THREAT ALERTING TO USER VIA MOBILE PHONE

(71) Applicant: Wipro Limited, Bangalore (IN)

(72) Inventors: Shashidhar Soppin, Bangalore (IN); Chandrashekar Bangalore Nagaraj, Bangalore (IN); Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 941 days.

(21) Appl. No.: 16/988,830

(22) Filed: Aug. 10, 2020

(65) Prior Publication Data
US 2021/0366269 A1 Nov. 25, 2021

(30) Foreign Application Priority Data
May 22, 2020 (IN) .............................. 202041021615

(51) Int. Cl.
*G08B 31/00* (2006.01)
*G06N 3/0442* (2023.01)
(Continued)

(52) U.S. Cl.
CPC ........... *G08B 31/00* (2013.01); *G06N 3/0442* (2023.01); *G06N 3/0464* (2023.01); *G08B 13/1627* (2013.01); *G08B 21/02* (2013.01); *G08G 1/005* (2013.01); *G08G 1/166* (2013.01); *G05B 2219/40563* (2013.01); *G05B 2219/40577* (2013.01); *G06F 18/214* (2023.01);
(Continued)

(58) Field of Classification Search
CPC .... G08B 31/00; G08B 13/1627; G08B 21/02; G08G 1/005; G08G 1/166; G05B 2219/40563; G05B 2219/40577; G06N 3/0464; G06N 20/00
See application file for complete search history.

(56) References Cited

U.S. PATENT DOCUMENTS 8,743,200 B2    6/2014  Anderson
10,024,667 B2   7/2018  Moore et al.
(Continued)

OTHER PUBLICATIONS

Sharma Banjade et al., "Vulnerable Road User Safety Enhancement Towards Achieving Vision Zero" Dec. 12, 2019, U.S. Appl. No. 62/947,426, pp. 1-87. (Year: 2019).*
(Continued)

*Primary Examiner* — Miranda M Huang
*Assistant Examiner* — Chase P. Hinckley
(74) *Attorney, Agent, or Firm* — Finnegan, Henderson, Farabow, Garrett & Dunner, LLP

(57) ABSTRACT

Embodiments of the present disclosure relate to a method and an apparatus for alerting threats to users. The apparatus may capture a plurality of signals including at least one of Electro-Magnetic (E-M) signals and sound signals. The E-M signal and sound signals are used to detect objects around the user. A threat to the user is predicted based on the objects around the user and one or more alerts are generated such that the user avoids the threat. The prediction of the threat enables the user to take an action even before the threat has occurred. Also, the alerts are generated based on the prediction such that the user can avoid the threat well in advance of the occurrence of the threat.

16 Claims, 10 Drawing Sheets

(51) Int. Cl.
*G06N 3/0464* (2023.01)
*G08B 13/16* (2006.01)
*G08B 21/02* (2006.01)
*G08G 1/005* (2006.01)
*G08G 1/16* (2006.01)
*G06F 18/214* (2023.01)
*G06N 3/04* (2023.01)
*G06N 3/08* (2023.01)
*G06V 20/52* (2022.01)

(52) U.S. Cl.
CPC .......... *G06N 3/04* (2013.01); *G06N 3/08* (2013.01); *G06V 20/52* (2022.01)

(56) References Cited

U.S. PATENT DOCUMENTS

| | | | |
|---|---|---|---|
| 10,079,929 | B2 | 9/2018 | Lord et al. |
| 10,366,586 | B1 | 7/2019 | Leizerovich et al. |
| 10,565,863 | B1* | 2/2020 | Kim ................ G08G 1/095 |
| 10,860,873 | B2* | 12/2020 | Lakshmi Narayanan ................ G06V 20/56 |
| 10,906,535 | B2* | 2/2021 | Solmaz ............... G08G 1/0129 |
| 10,950,125 | B2* | 3/2021 | Solmaz ............... H04B 17/327 |
| 11,017,661 | B1* | 5/2021 | Beauchamp ........... H04W 4/44 |
| 11,328,603 | B1* | 5/2022 | Paran ................... G06V 20/53 |
| 11,521,396 | B1* | 12/2022 | Jain ..................... G06N 3/0455 |
| 11,587,329 | B2* | 2/2023 | Ranga ............... B60W 30/0956 |
| 2015/0036920 | A1* | 2/2015 | Wu ..................... G06V 10/764 382/156 |
| 2017/0309149 | A1 | 10/2017 | Kaura |
| 2018/0165976 | A1 | 6/2018 | Mahnke et al. |
| 2019/0057584 | A1 | 2/2019 | Brayton |
| 2019/0287394 | A1* | 9/2019 | Aoude ................. G08G 1/163 |
| 2021/0122364 | A1* | 4/2021 | Lee ..................... B60W 10/04 |
| 2021/0125076 | A1* | 4/2021 | Zhang ................ G08G 1/0137 |
| 2021/0183244 | A1* | 6/2021 | Malhan ................ B64U 50/34 |
| 2021/0247196 | A1* | 8/2021 | Wells ................... G06Q 50/30 |
| 2021/0312795 | A1* | 10/2021 | Schonfeld .......... G08G 1/0129 |
| 2022/0388505 | A1* | 12/2022 | Sharma Banjade ... G08G 1/005 |
| 2023/0095384 | A1* | 3/2023 | Sharma Banjade ........................ G08G 1/096725 701/301 |

OTHER PUBLICATIONS

Sharma Banjade et al., "Vulnerable Road User Safety based on Responsibility Sensitive Safety (RSS) Check for Autonomous Vehicle" Dec. 12, 2019, U.S. Appl. No. 62/947,417, pp. 1-91. (Year: 2019).*

Beauchamp et al., "Method and System for Pedestrian-to-Vehicle Collision Avoidance" Nov. 27, 2019, U.S. Appl. No. 62/941,530, pp. 1-62. (Year: 2019).*

Beauchamp et al., "Method and System for Pedestrian-to-Vehicle Collision Avoidance based on Amplified and Reflected Wavelength" Mar. 12, 2020, U.S. Appl. No. 62/988,526, pp. 1-43. (Year: 2020).*

Gaus et al., "Evaluating the Transferability and Adversarial Discrimination of Convolutional Neural Networks for Threat Object Detection and Classification within X-Ray Security Imagery" Nov. 20, 2019, arXiv: 1911.08966v1, pp. 1-6. (Year: 2019).*

Guatam et al., "SDVTracker: Real-Time Multi-Sensor Association and Tracking for Self-Driving Vehicles" Mar. 9, 2020, arXiv: 2003.04447v1, pp. 1-8. (Year: 2020).*

Ouaknine et al., "CARRADA Dataset: Camera and Automotive Radar with Range-Angle-Doppler Annotations" May 4, 2020, arXiv: 2005.01456v1, pp. 1-8. (Year: 2020).*

Liu et al., "Spatiotemporal Relationship Reasoning for Pedestrian Intent Prediction" Feb. 20, 2020, arXiv: 2002.08945v1, pp. 1-10. ( Year: 2020).*

Tahmasbi-Sarvestani et al., "Implementation and Evaluation of a Cooperative Vehicle-to-Pedestrian Safety Application" 2018, pp. 1-12. (Year: 2018).*

Hassan et al., "Cascaded Structure Tensor Framework for Robust Identification of Heavily Occluded Baggage Items from X-ray Scans" Apr. 14, 2020, arXiv: 2004.06780v1, pp. 1-13. (Year: 2020).*

Nguyen, Tu, "Spatiotemporal Tile-based Attention-guided LSTMs for Traffic Video Prediction" Feb. 17, 2020, arXiv: 1910.11030v3, pp. 1-6. (Year: 2020).*

Zhang et al., "STINet: Spatio-Temporal-Interactive Network for Pedestrian Detection and Trajectory Prediction" May 8, 2020, arXiv: 2005.04255v1, pp. 1-10. (Year: 2020).*

Shoeiby et al., "Mosaic Super-resolution via Sequential Feature Pyramid Networks" Apr. 15, 2020, arXiv: 2004.06853v1, pp. 1-10. (Year: 2020).*

Wang et al., "NAS-FCOS: Fast Neural Architecture Search for Object Detection" Feb. 25, 2020, arXiv: 1906.04423v4, pp. 1-9. (Year: 2020).*

* cited by examiner

ENVIRONMENT-BASED-THREAT ALERTING TO USER VIA MOBILE PHONE

TECHNICAL FIELD

The present disclosure relates to alerting users about threats. More particularly, the present disclosure relates to method and apparatus for predicting threats to users and alerting users about the threats.

BACKGROUND

Currently, usage of electronic gadgets is increasing exponentially. The electronic gadgets may not pose a great threat to users directly. However, when users are engrossed in using the electronic gadgets, the users often are distracted and do not pay attention to the surroundings. Especially, using electronic gadgets like mobile phones and headphones in streets attracts threats to the users. Likewise, using electronic gadgets in places where the users have to be attentive to the surroundings pose a threat to the users.

Conventional techniques alert users when a threat is detected. Few techniques include using sensors present in the electronic gadget to detect the threat to the users and provide an alert. Currently, technology has revolved around detecting different types of threats and warning the users once a threat is detected. Conventional techniques do not detect a type of object which causes the threat to the users, and thus provide generic alerts such as a visual notification or a voice notification for different types of threats. Hence, the users are not aware of type of threat and how to react to the threat. Therefore, there is a need to provide a solution which enables users to avoid the threat.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of alerting threats to users. The method comprises receiving a plurality of signals comprising at least one of Electro-Magnetic (E-M) signals and sound signals, from one or more sensors associated with the apparatus. The plurality signals are related to an environment around the user. The method further comprises, detecting one or more objects around the user using the plurality of signals. Further, the method comprises, predicting a threat to the user caused by the one or more objects around the user based on at least one of, one or more rules and an Artificial Model (AI) model. Thereafter, the method comprises generating one or more alerts based on the predicted threat posed by the one or more objects. The one or more alerts are provided to the user to enable the user to avoid the threat.

In an embodiment, the present disclosure discloses an apparatus for alerting users. The apparatus comprises a processor and a memory. The processor is configured to receive a plurality of signals comprising at least one of Electro-Magnetic (E-M) signals and sound signals, from one or more sensors associated with the apparatus. The plurality signals are related to an environment around the user. The processor is further configured to detect one or more objects around the user using the plurality of signals. The processor further configured to predict a threat to the user caused by the one or more objects around the user based on at least one of, one or more rules and an Artificial Model (AI) model. Furthermore, the processor is configured to generate one or more alerts based on the predicted threat posed by the one or more objects, such that the one or more alerts enable the user to avoid the threat.

In an embodiment, the present disclosure discloses a non-transitory medium including instructions stored thereon that when processed by at least one processor cause a device to perform operations comprising receiving a plurality of signals comprising at least one of Electro-Magnetic (E-M) signals and sound signals, from one or more sensors associated with the apparatus. The plurality signals are related to an environment around the user. The operations further comprises, detecting one or more objects around the user using the plurality of signals. Further, the operations comprises, predicting a threat to the user caused by the one or more objects around the user based on at least one of, one or more rules and an Artificial Model (AI) model. Thereafter, the operations comprises generating one or more alerts based on the predicted threat posed by the one or more objects. The one or more alerts are provided to the user to enable the user to avoid the threat.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
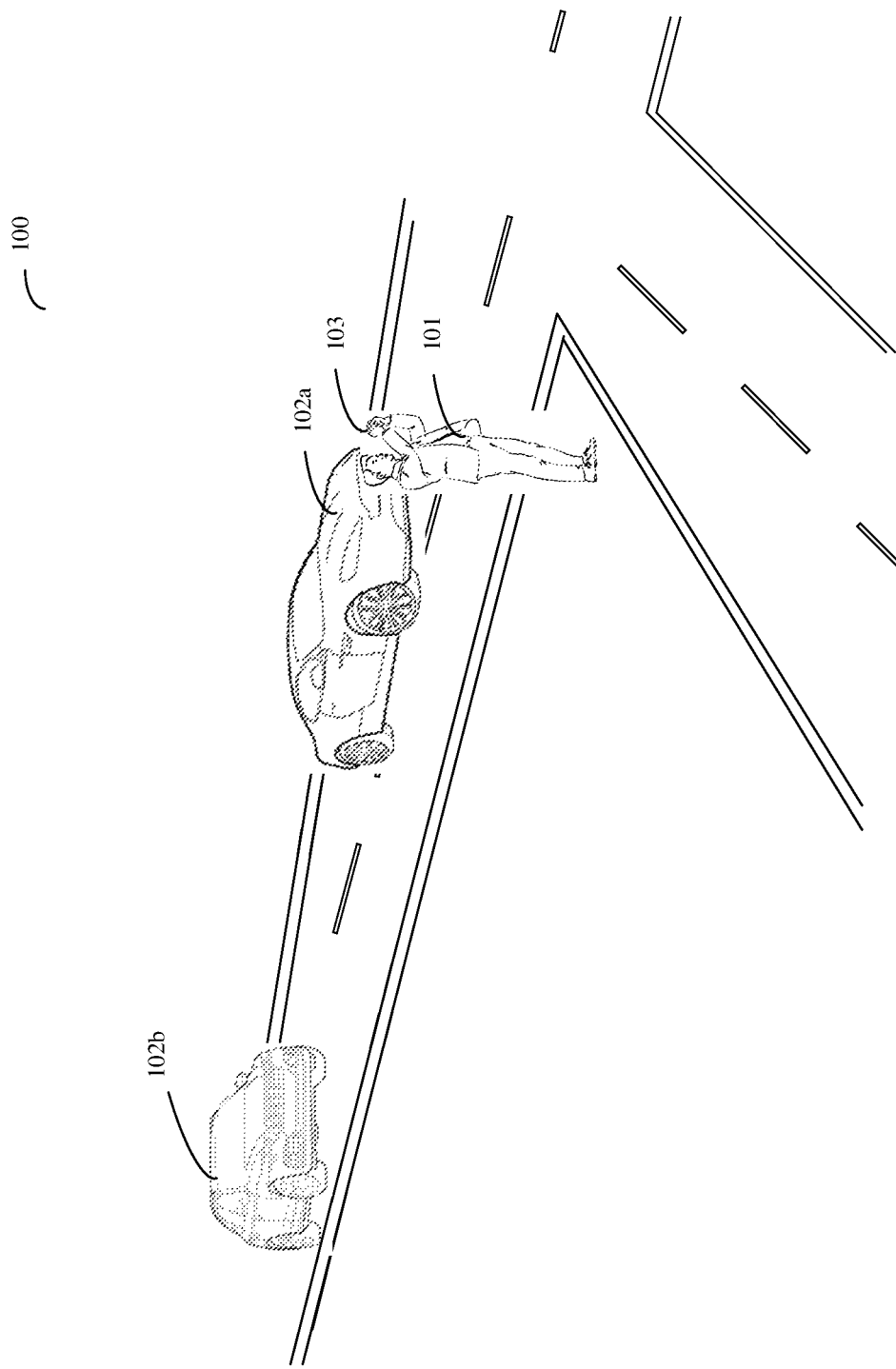
FIG. 1 shows an exemplary environment illustrating possible threats to a user, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and an apparatus for alerting threats to users. The apparatus may be a mobile phone or a headphone or a tablet or any other electronic gadget associated with a user. The apparatus may comprise various sensors or the sensors may be mounted on the apparatus when apparatus does not comprise the sensors. The sensors are used to capture a plurality of signals including at least one of Electro-Magnetic (E-M) signals (e.g., light signals) and sound signals. The E-M signal and sound signals are used to detect objects (e.g., vehicles, sharp objects) around the user. A threat to the user is predicted based on the objects around the user and one or more alerts are generated to enable user to avoid the threat. The prediction of the threat enables the user to take an action even before occurrence of an event that poses a threat to the user. Also, the alerts are generated based on the prediction such that the user can avoid the threat well in advance.

FIG. 1 shows an exemplary environment (100). The environment (100) comprises a user (101), a plurality of vehicles (102a, 102b) and an apparatus (103). The environment (100) may depict a scenario where the user (101) is standing on a side-walk while the plurality of vehicles (102a, 102b) travel along a road. As seen in FIG. 1, the user (101) uses the apparatus (103) while standing on the side-walk. The apparatus (103) may be, but not limited to, a mobile phone, a headphone, a tablet, a radio, smart watch, or any electronic device. Generally, the apparatus (103) (as mentioned above) comprises various sensors like a camera, a microphone, an accelerometer, a magnetometer and the like. Few apparatus (103) may also comprise sensors which measure Infra-Red (IR) radiations, Radio Frequencies (RF) radiations and the like. It is commonly known that many users use the electronic gadgets while walking on streets, hiking, and elsewhere. Due to the increased use of the electronic gadgets, the users may be unaware of the threats that may occur to them. FIG. 1 may represent such a scenario where the user (101) may be using the apparatus (103) while standing on the side-walk. The plurality of vehicles (102a, 102b) may act as a threat to the user (101). As the user (101) is close to the road, the there exists a threat to the user (101). The present disclosure makes use of the apparatus (103) to predict a threat to the user (101) and alert about the threat to the user (101). In an embodiment, the apparatus (103) may capture a plurality of signals comprising at least one of Electro-Magnetic (E-M) signals and sound signals. In an embodiment, the plurality of signals may provide information related to the environment (100). For example, the plurality of signals may indicate one or more objects around the user (101). In FIG. 1, the apparatus (103) may capture an image of the vehicle (102a) and determine that the vehicle (102b) may not be threat, as it is moving in a lane farther from the user (101). However, the apparatus (103) may capture an image of the vehicle (102b) and predict that the vehicle (102b) may act as a threat to the user (101) as it is moving in a lane closer to the user (101). The apparatus (103) may provide a suitable alert to the user (101) to avoid the threat. For example, the apparatus (103) may instruct the user (101) to move back and away from the road due to the approaching vehicle (102b).

In an embodiment, the apparatus (103) may have computing capability to process the plurality of signals and provide the one or more alerts spontaneously to enable the user (101) to avoid the threat. In an embodiment, the one or more alerts are provided based on the threat. For instance, the one or more alerts may be customized based on the one or more objects that may cause the threat to the user (101). As the one or more alerts are customized, the user (101) may be able to avoid the threat, unlike conventional techniques, where the alerts are generic irrespective of different types of threats and threats from different objects.

Figure 2:
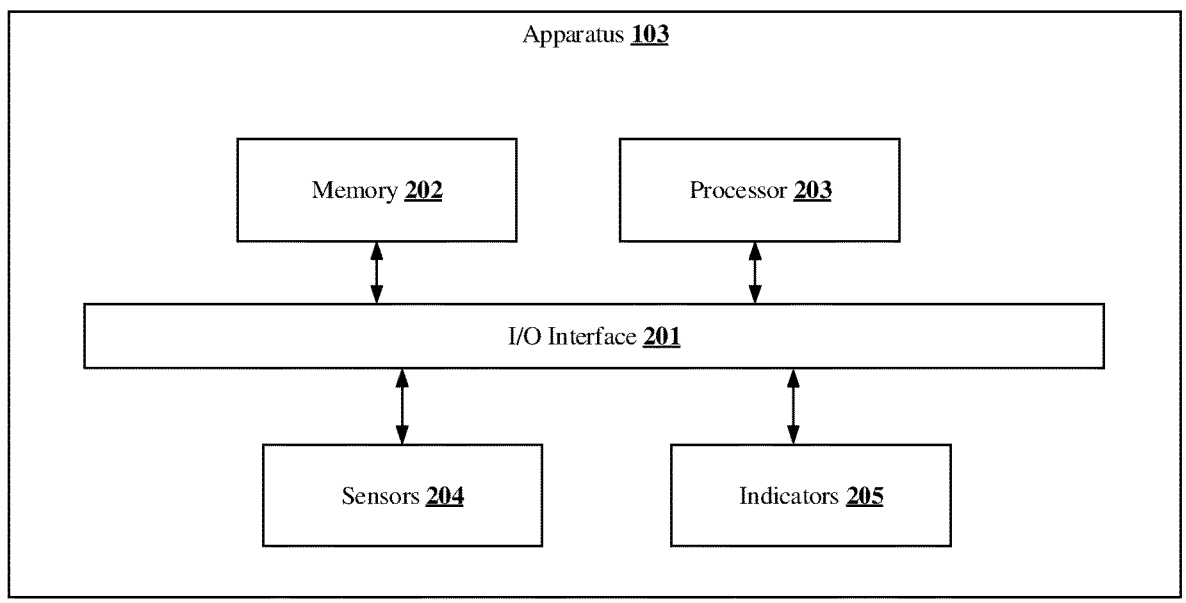
FIG. 2 shows an exemplified block diagram of an apparatus for alerting threats to users, in accordance with some embodiments of the present disclosure.

FIG. 2 shows an exemplified block diagram of the apparatus (103) for alerting threats to the user (101), in accordance with some embodiments of the present disclosure. The apparatus (103) shown in FIG. 2 is only for illustrating the aspects of the present disclosure and should not be considered as a limitation. As shown in the FIG. 2, the apparatus (103) may comprise an Input/Output (I/O) interface (201), a memory (202), a processor (203), a communication bus (204), sensors (204) and indicators (205). A person of ordinary skills will appreciate that the apparatus (103) may comprise various other components not disclosed in the FIG. 2.

In an embodiment, there may be one or more sensors in the apparatus (103). For illustration, the phrase "sensors" is used in the present disclosure and the phrase should not be considered as a limitation. Likewise, there may be one or more indicators in the apparatus (103), and the phrase "indicators" should not be considered as a limitation. The sensors (204) may be configured to measure the plurality of signals, which includes at least one of the E-M signals and the sound signals. For example, a camera of the apparatus (103) may measure light signals and capture a plurality of images of the environment (100). In another example, a microphone of the apparatus (103) may measure sound signals in the environment (100). The sensors (204) may further include, but are not limited to, an IR sensor and a RF sensor. The sensors (204) may be configured to measure the plurality of signals at defined intervals. In an embodiment, the defined intervals may be dynamically changed by the apparatus (103). For example, in a traffic environment, the number of measurements required to predict a threat may be more and intervals of the measurements may be short (e.g., every 1 second). In another example, in a hilly environment, the number of measurements may be less and intervals of measurement may be long (e.g., every 2-3 seconds).

In an embodiment, the processor (203) receives the plurality of signals from the sensors (204) via the I/O interface (201). When the received plurality of signals are images and sound signals, the processor (203) may use image processing and signal processing techniques to predict the threat to the user (101). In an embodiment, the processor (203) may pre-process the plurality of signals. Pre-processing may include, but not limited to, sharpening the images, reducing noise in the images, adjusting contrast of the images, adjust brightness of the images, adjust hue parameters of the images, reducing noise in sound signals, and amplifying strength of the sound signals. In an embodiment, the processor (203) receives the plurality of signals as time series data.

In an embodiment, the processor (203) may detect the one or more objects using pre-processed plurality of signals. With reference to FIG. 1, the one or more objects may be the vehicles (102a, 102b). Likewise, the one or more objects may vary for different environments. In an embodiment, the processor (203) may determine movement of the one or more objects using the time series data. In an embodiment, the processor (203) uses Convolution Neural Network (CNN) to process the images and sound signals. Further, the processor (203) may estimate an impact of the one or more objects to the user. In an embodiment, the impact of the one or more objects on the user may be estimated using one or more rules or an Artificial Intelligence (AI) model. In an embodiment, the one or more rules may be defined by a domain expert and the one or more rules may be stored in the memory (202). Further, the one or more rules may be used to train the AI model. The trained AI model may generate further rules not defined in the one or more rules using training signals. In an embodiment, the AI model may be implemented using one or more of the techniques including, but not limited to, regression technique, Bayes technique, K-nearest neighbour technique, and support vector technique. Further, based on the estimated impact of the one or more objects, the processor (203) may predict the threat to the user from the one or more objects. For example, referring to FIG. 1, the impact of threat of the vehicle (102a) on the user (101) may be less compared to the impact of threat of the vehicle (102b) on the user (101). Hence, the processor (203) may predict that the vehicle (102b) is a threat to the user (101).

In an embodiment, the processor (203) may generate one or more alerts based on the predicted threat to the user (101). In an embodiment, while the processor (203) estimates the impact of the one or more objects, the processor (203) simultaneously determines historical alerts that were generated when historical objects similar to the one or more objects were detected. Further, the processor (203) generates the one or more alerts based on the determined historical alerts and the detected one or more objects. The one or more alerts are provided to the user to caution the user of a possible threat. Therefore, when a possible threat is predicted, the one or more alerts are provided to the user (101) without delay. Further, the processor (203) may update the one or more alerts by identifying the one or more objects, and based on a severity of the threat by the one or more objects. For example, when a vehicle (102b) is detected, the processor (203) may compare the vehicle (102b) with historical objects and generate an alert such as "a vehicle is nearby" immediately. The immediate alert may be generated even before complete processing of the plurality of signals. Hence, the user (101) is alerted about the threat. Further, when the vehicle (102b) is identified as a car and a speed and direction of the vehicle is determined, a customized alert such as "the car is approaching fast on your left. Move to your right by 2 metres" may be provided to the user (101).

In an embodiment, the one or more alerts may be provided using the indicators (205). The indicators (205) may include, but not limited to, a screen, a speaker, and a haptic actuator. For example, when the user (101) is wearing a headphone, the one or more alerts may be provided as an audio via the speaker and vibrations via the haptic actuator. In another example, when the user (101) is using a mobile phone, the one or more alerts may be provided with vibrations via the haptic actuator, audio via the speaker and a visual via the screen. Therefore, the user (101) is not only provided with an alert to indicate a threat, but also specific instructions to avoid the threat.

Figure 3:
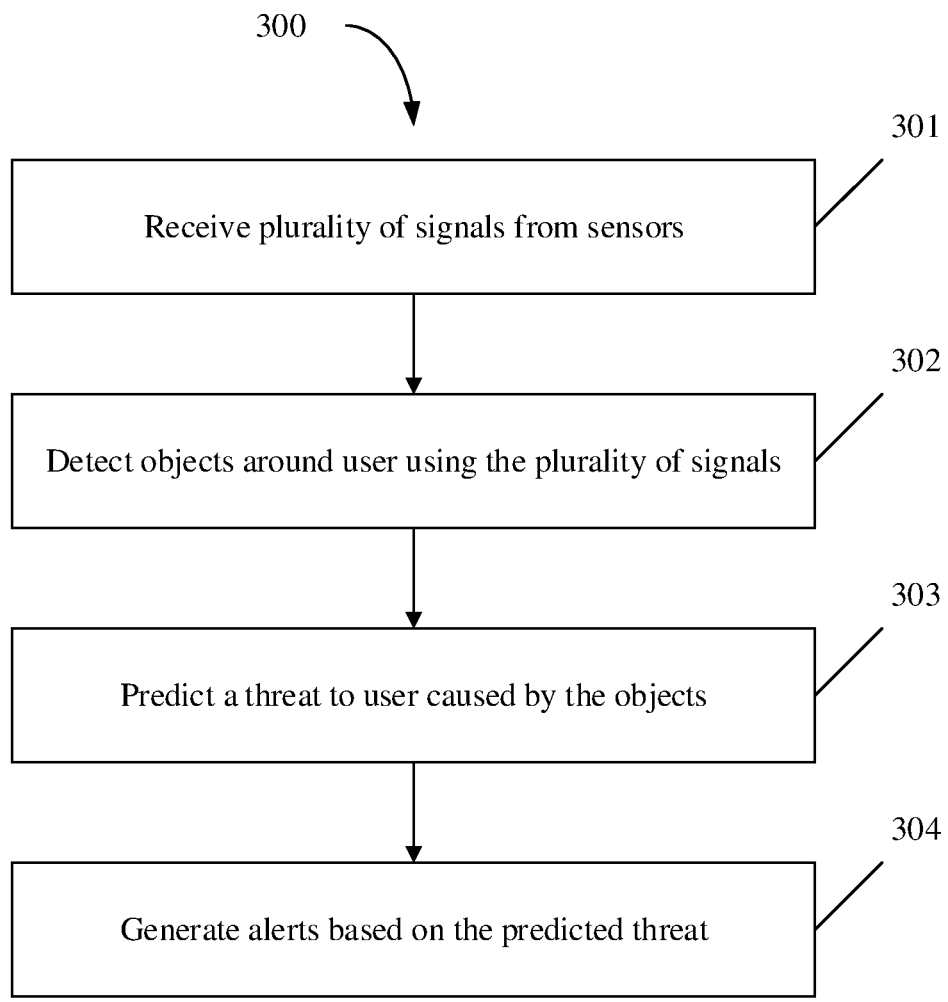
FIG. 3 shows an exemplary flow chart illustrating method steps for alerting threats to users, in accordance with some embodiments of the present disclosure.

FIG. 3 shows an exemplary flow chart illustrating method steps for alerting threats to users, in accordance with some embodiments of the present disclosure. As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof. FIG. 3 is described by making reference to FIG. 4, FIG. 5, FIG. 6 and FIG. 7.

At step (301), the processor (203) receives the plurality of signals from the sensors (204). In an embodiment, the commonly received signals may include the E-M signals (e.g., light, IR, RF) to capture images and sound signals from the environment (100). Now referring to FIG. 5, which illustrates a use case involving threats to the user (101). As shown in the FIG. 5, the user (101) is walking on the side-walk while using the mobile phone (103). The vehicles (102a, 102b) or the street light (501) may pose a threat to the user (101). The processor (203) in the apparatus (103) (mobile phone in this use case), configures a camera in the apparatus (103) to capture the light signals around the user (101) to form images. Further, the processor may also configure a microphone in the apparatus (103) to capture sound signals around the user. The processor (203) may receive both the images and the sound signals from respective sensors (camera and microphone). The processor (203) may pre-process the signals as described earlier. Further, the received plurality of signals may be time series data. In an embodiment, the processor (203) may instruct the sensors (204) to capture the plurality of signals at defined intervals. Therefore, the processor (203) may receive sufficient data to accurately identify the one or more objects, as well as receive the sufficient data at high rate to identify quickly. Hence, the movement of the vehicles (102a, 102b) may be captured.

Figure 5:
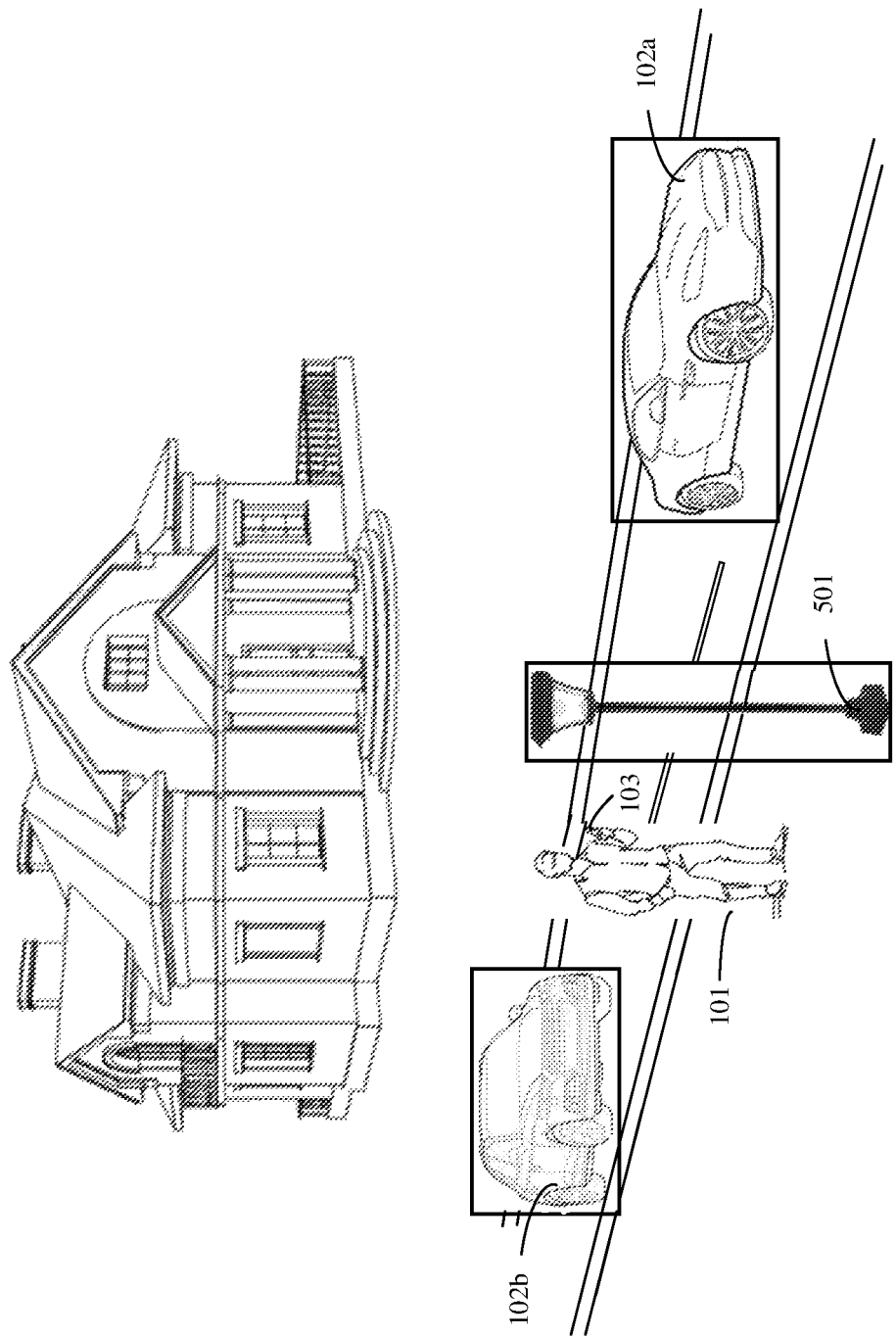
FIG. 5 shows an illustration of a use case involving threats to a user, in accordance with embodiments of the present disclosure.
Figure 6:
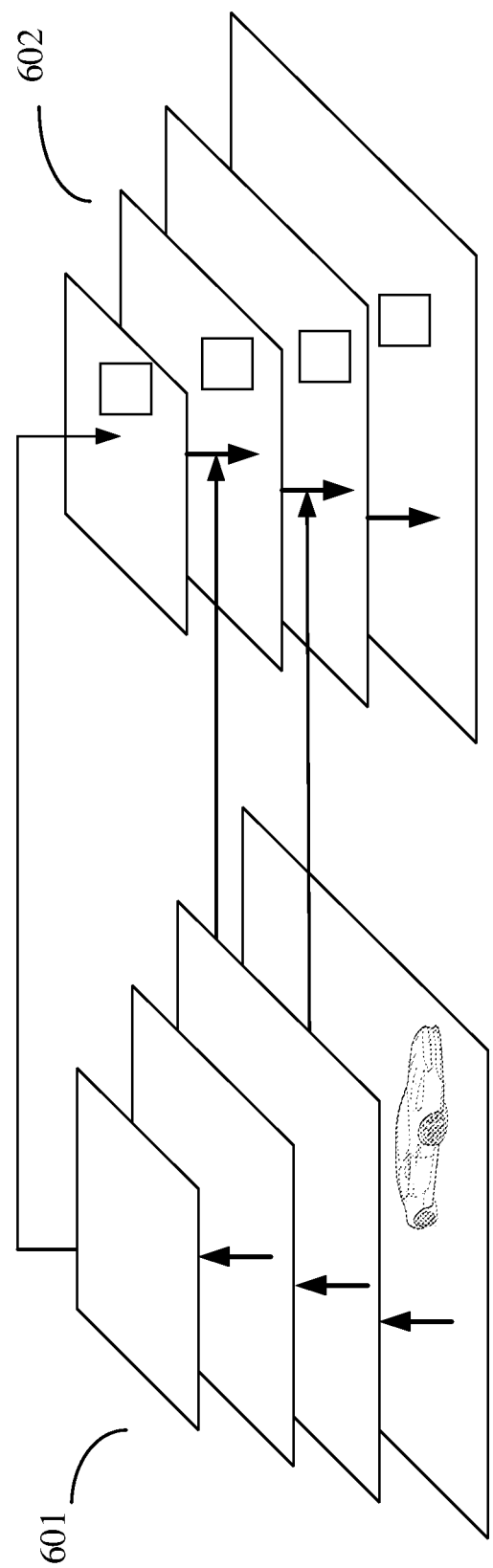
FIG. 6 shows an exemplary block diagram of a Feature Pyramid Network (FPN) for determining spatial and temporal features, in accordance with embodiments of the present disclosure.

At step (302), the processor (203) detects the one or more objects around the user (101). As shown in FIG. 5, the one or more objects may include, the vehicles (102a, 102b) and the street light (501). The processor (203) detects the one or more objects using image processing and sound processing techniques. As shown in FIG. 5, once the one or more objects are detected, the one or more objects are tracked. The square boxes in the FIG. 5 shows the tracking of the one or more objects. In an embodiment, the one or more objects may be mobile (e.g., vehicles (102a, 102b) or stationary (street light (501)). Further, the processor (203) identifies the one or more objects. The processor may use one or more spatial features and one or more temporal features to identify the one or more objects preferably using images. In an embodiment, CNN may be applied for the images and sound signals to detect and classify the one or more objects. In an embodiment, commonly used technique like Long Short-Term Memory (LS™) may be used to determine the objects using the sound signals. The processor (203) may apply the one or more spatial filters on each image. The one or more spatial filters may be one or more convolution kernels. In an embodiment, the images may be represented as an image matrix comprising a plurality of elements. Each element of the matrix represents a pixel value.

In an embodiment, Feature Pyramid Network (FPN) may be used to extract the features faster and with accuracy. The FPN is illustrated by making reference to FIG. 6. As shown in the FIG. 6, image pyramids are generated using bottom-up approach (601) and top-down approach (602). The arrow in the FIG. 6 indicates the flow of feature data among layers of the CNN. In an embodiment, higher resolution images may have low semantic value and lower resolution images may have higher semantic value. In the bottom-up approach (601), the spatial resolution decreases whereas semantics of features increases. In the top-down approach (602), the spatial resolution increases whereas the semantics of the features decreases. FPN uses both the bottom-up approach (601) and the top-down approach (602) simultaneously, while having a lateral connection between the two approaches (601 and 602). The simultaneous approaches increase semantics of the features and the lateral connection improves the spatial location of the features. The square box in the FIG. 6 indicates the spatial locations of the objects. Hence, the one or more objects are identified with more accuracy and with high speed. Hence, the FPN enables real-time application. Referring back to FIG. 5, the one or more objects (102a, 102b and 501) are detected with accuracy and speed. The image is then represented as a matrix. In an embodiment, the one or more objects may be categorized based on the detected features. For example, vehicles may be categorized together, stationary objects on a street may be categorized together, and natural objects (e.g., hills, rocks) may be categorized together. Based on the categories, suitable alerts may be provided.

Figure 4:
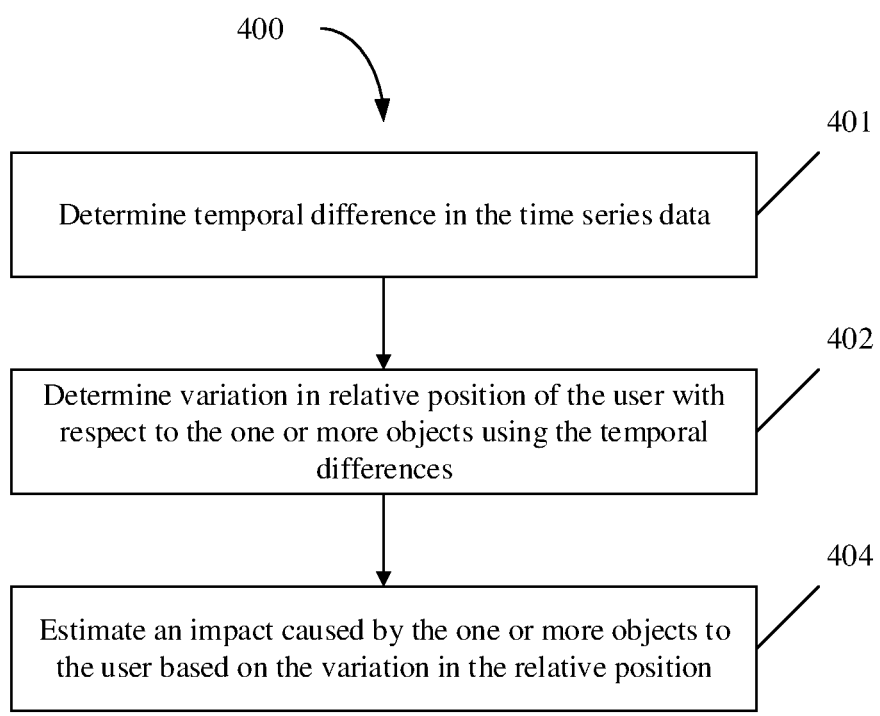
FIG. 4 shows an exemplary flow chart illustrating method steps for identifying threats to users, in accordance with some embodiments of the present disclosure.

Reference is now made to FIG. 4 which illustrates method steps for estimating impact of detected one or more objects on the user (101) for identifying threats to users (101). The following description is also described by making reference to the FIG. 5.

At step (401), the processor (203) determines a temporal difference in the time series data. As described earlier, the processor (203) receives the plurality of signals as time series data. The time series data is used to determine changes in the images with change in time. Referring to the FIG. 5, the movement of the vehicle (102a) can be determined by processing the time series data. For instance, the processor (203) may determine that the vehicle (102a) is moving away from the user (101) and the vehicle (102b) is moving towards the user (101) using the time series data.

Referring back to FIG. 4, at step (402), the processor (203) determines a variation in relative position of the user (101) with respect to the one or more objects using the temporal difference. In this step, the processor (203) determines the spatial location of the user (101) and the one or more objects for each input data. For example, when the input is the images, the processor (203) determines the spatial location of the user (101) (location of the apparatus 103) and the spatial location of the one or more objects. Likewise, for each sound signal, the spatial location of the one or more objects is determined using Doppler effect. Using the temporal differences in the time series data, the relative position between the user (101) and the one or more objects is determined. Referring to FIG. 5, assuming the user (101) is stationary, the relative position of the user (101) from the vehicle (102a) increases as the vehicle (102a) moves away from the user (101). Likewise, the relative position of the user (101) from the vehicle (102b) decreases as the vehicle (102b) moves towards the user (101), The relative position of the user (101) from the street lamp (501) remains constant as the street light is also stationary.

Referring again to FIG. 4, at step (403), the processor (203) estimates an impact caused by the one or more objects on the user (101). The processor (203) uses the relative position of the user (101) with respect to the one or more objects to estimate an impact of the one or more objects on the user (101). In an embodiment, an impact of a plurality of objects on the user (101) may be defined in the one or more rules. In an embodiment, the impact may be a measure of danger of the one or more object to the user (101). For example, an impact score of a presence of a knife near the user (101) may high, while an impact score of a vehicle near the user (101) may be low. However, an impact score of a knife near the user (101) may be low compared to an impact score of a vehicle approaching the user (101) at a high speed. The one or more rules may define a plurality of instances and an impact score of each object in each instance. In an embodiment, the AI model may update or replace or add impact scores to the one or more rules based on the historical estimation of the impact score.

Referring back to FIG. 3, at step (303), the processor predicts a threat to the user (101) by the one or more objects. In an embodiment, the processor (203) may predict the threat to the user (101) based on the one or more rules or the AI model. In an embodiment, the processor (203) may predict the threat as soon as the objects are identified, and even before the time series data is processed. Hence, an alert may be generated as soon as the threat is predicted. For example, a knife detected near the user (101) may be predicted as a threat to the user (101). The knife may be detected in a single image and in subsequent images, and the user may be moving away from the knife. The threat is predicted although the threat may be a false positive in order not to ignore true positives. In an embodiment, after the subsequent images are processed, an appropriate prediction of the threat may be performed.

In an embodiment, the AI model is used to predict the threat. The AI model may be trained to predict the threat during a training stage. In an embodiment, the one or more rules and a plurality of training signals are provided to the AI model as input. Each of the plurality of signals may be associated with a threat based on the one or more rules. For example, the AI model may be provided with images having different vehicles approaching the user (101). The AI model is trained to predict the threat for each image having different vehicles. Likewise, the AI model may be trained to determine the threat for different training signals indicating a threat to the user from different objects. The AI model may be provided with a plurality of testing signals after training the AI model. Once the AI model is trained with sufficient training signals, the AI model is provided with testing signals to determine an accuracy and speed of the AI model. An output of the AI model may be evaluated by the domain expert and accordingly a feedback may be provided. The output may be evaluated based on the one or more rules. Further, the AI model may update/adjust weights and bias based on the feedback. In an embodiment, the AI model may update or replace or add rules to the one or more rules based on the training and testing of the AI model. In an embodiment, reinforcement learning may be used in the AI model to update the one or more rules.

Figure 7A:
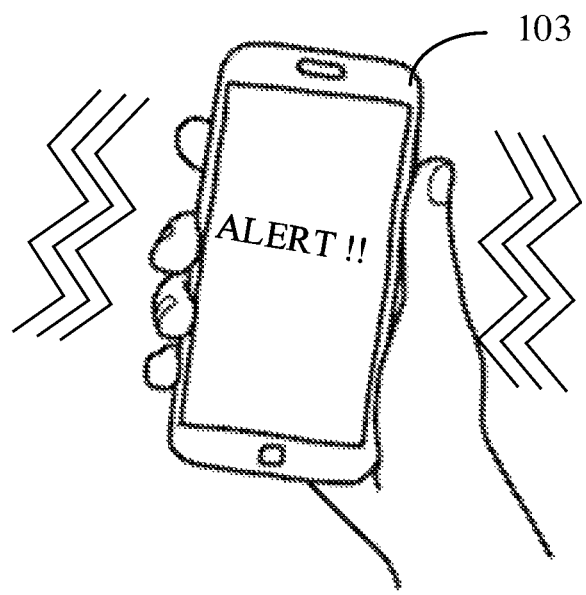
FIG. 7A and FIG. 7B show illustrations of alerting a threat to a user, in accordance with embodiments of the present disclosure.
Figure 7B:
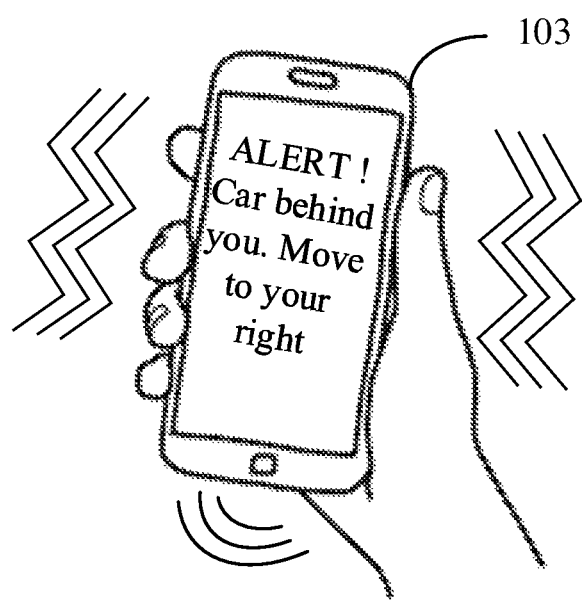

At step (304), the processor (203) may generate the one or more alerts based on the predicted threat. In one embodiment, when the threat to the user (101) is predicted using less number of signals, the one or more alerts and instructions are provided to enable the user (101) to avoid the threat. In this case, a single alert may be provided to alert the user (101). In an embodiment, when more number of signals are required to predict the threat to the user (101), and when the one or more objects detected in the signals are being categorized and are processed using the CNN, the processor (203) may determine historical alerts that were generated when historical objects similar to the one or more objects were detected. The historical objects may be detected during the training stage or during earlier instances. The processor (203) may further retrieve or determine historical alerts that were generated in response to the threat from the historical objects. Thereafter, the processor (203) generates the one or more alerts based on the historical alerts. Referring to FIG. 5, as soon as the vehicles (102a, 102b) are detected, the processor (203) may determine the historical alerts that were generated previously when the vehicles (102a, 102b) were detected. In an embodiment, the processor (203) may select one or more alerts from the historical alerts. For example, in first historical event, a first apparatus may have alerted the user to move in a particular way to avoid a collision with the vehicles (102a, 102b). In a second historical event, a second apparatus may have generated an alert only to indicate a presence of the vehicles (102a, 102b). The processor (203) may select the alert generated by the second apparatus as the one or more objects in the current instance may not be processed yet. Hence, the processor (203) may generate an alert to the user (101) indicating a presence of the vehicles (102a, 102b). Further, the processor (203) may update the one or more alerts based on the complete processing of the plurality of signals. Further, the one or more alerts are provided to the user (101). For example, the processor (203) may generate an alert to indicate the user (101) that the vehicle (102b) is fast approaching the user (101) and inform the user (101) to move away from the road. Also, the processor (203) may generate an alert that indicates about the street light (501) in front of the user (101). The initial one or more alerts may caution the user (101) about a probable threat from the one or more objects and the updated one or more alerts may enable the user (101) to avoid the threat from the one or more objects. The one or more alerts and the one or more updated alerts may be provided using the indicators (205) in the apparatus (103). FIG. 7A and FIG. 7B show illustrations of alerting a threat to a user. In an embodiment, the FIG. 7A may illustrate the alert provided to the user (101) before the one or more objects are categorized and FIG. 7B may illustrate the updated alert and instructions provided to the user (101) to enable the user (101) to avoid the threat. Further, the one or more alerts may be based on the category of the one or more objects. For example, an alert generated based on a truck may be different from an alert generated based on a car. The instructions provided to the user (101) to avoid the threat caused by the truck may also be different from the instructions provided to the user (101) to avoid the threat caused by the car. Table 1 illustrates alerts provided for different categories of objects:

TABLE 1

| Index | Type of alert | Action to be taken |
|---|---|---|
| 1 | Vehicle (4-wheeler or two wheeler) approaching at normal speed from the right side | Move to the left side by 15-20 feet and allow the vehicle to pass |
| 2 | Vehicle (4-wheeler or two wheeler) approaching at normal speed from the left side | Move to the left side by 15-20 feet and allow the vehicle to pass. |
| 3 | Vehicle (6+ wheel (Bus, Truck, Heavy duty vehicle) approaching at normal speed from left or right | Move to the left/right side respectively by 30-40 feet and allow the vehicle to pass. |
| 4 | Vehicle (any type) approaching very fast in the direction the user is walking | Move away from the direction of the vehicle immediately/ASAP. |
| 5 | Normal pedestrians or cycles are approaching at normal speed | Move away from the respective direction and take precaution |

In an embodiment, a mobile application may be used to configure setting related to alerts. The user (101) may customize volume of alerts, display and haptics of the alerts. In an embodiment, the user (101) may provide a feedback to the AI model using the application when the alerts are generated.

Figure 8:
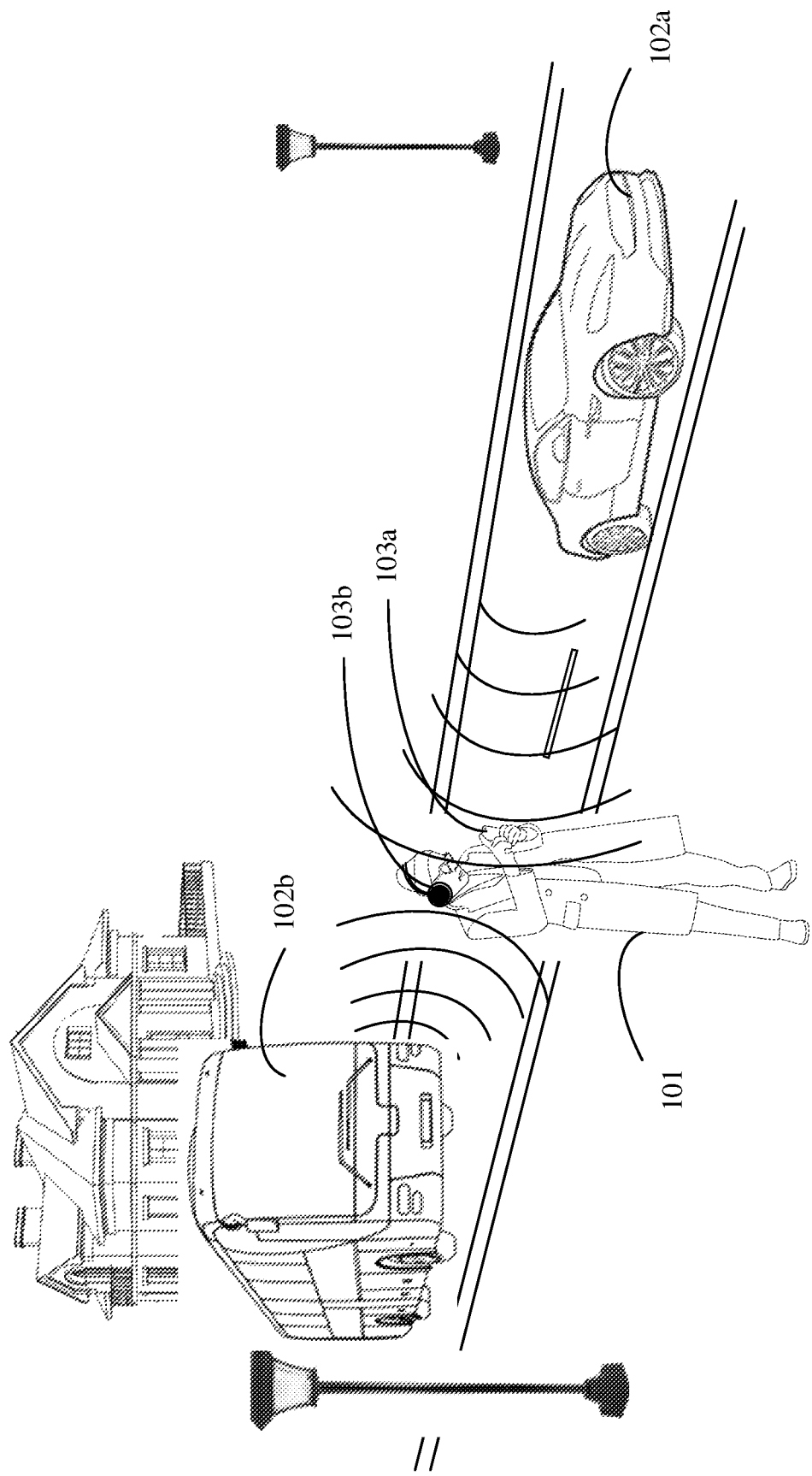
FIG. 8 and FIG. 9 show illustrations of different use cases involving threats to a user, in accordance with embodiments of the present disclosure.
Figure 9:
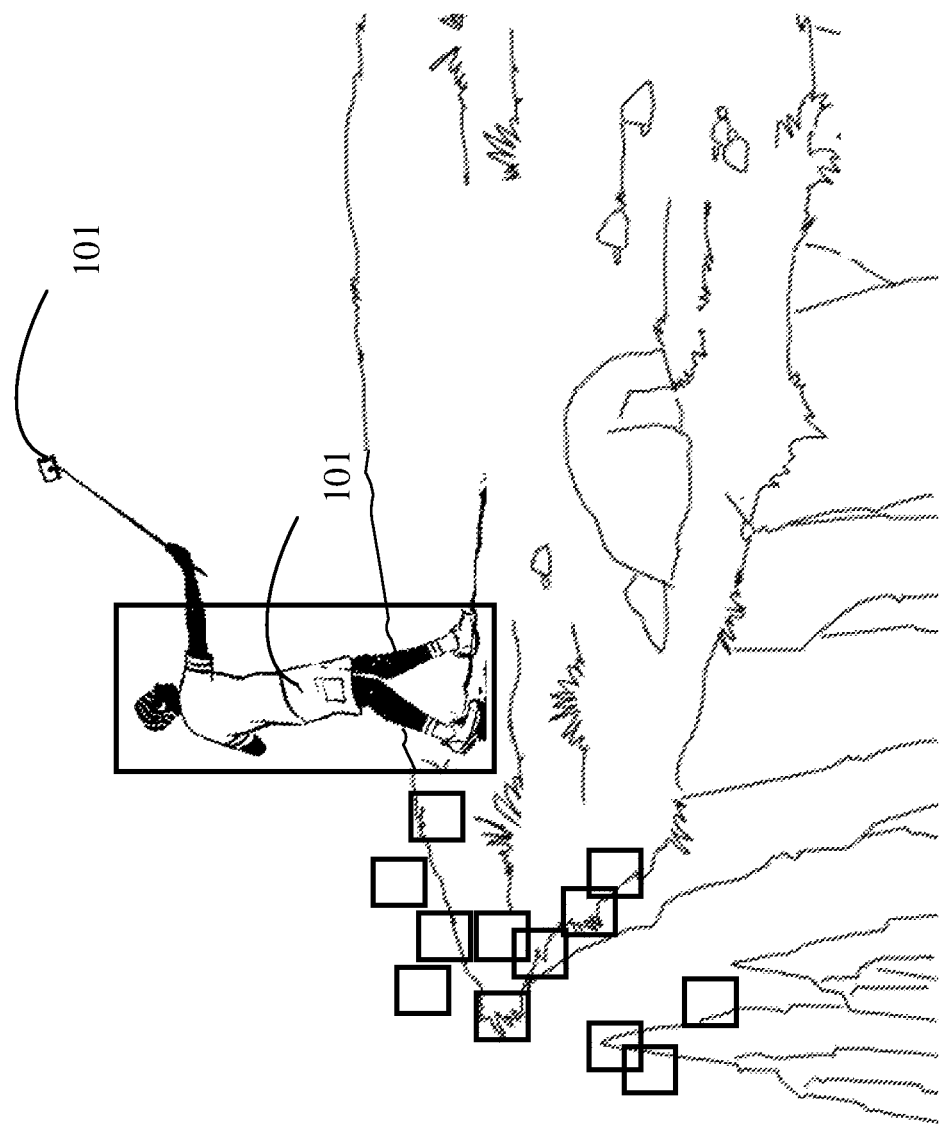

FIG. 8 and FIG. 9 show illustrations of different use cases involving threats to a user. As shown in FIG. 8, the user (101) may be using a mobile phone (103a) while also listening to music using a headphone (103b). The user (101) may be under threat by the vehicles (102a, 102b) around the user (101). The one or more objects and movement of the one or more objects may be detected using the Doppler effect using the sound signals captured by the headphone (103b) and images captured by the mobile phone (103a). In an embodiment, the headphone (103b) may be connected to the mobile phone (103a). In an embodiment, the headphone (103b) may process and provide the alerts or the headphone (103b) may measure and sound signals and send the sound signals to the mobile phone (103a), which may process and generate the alerts. The headphone (103b) and the mobile phone (103a) may provide the alerts to the user (101).

FIG. 9 is another use case where the user (101) is on a cliff and is close to an edge of the cliff. As seen in FIG. 9, the user is using a mobile phone (103) and the user may be moving backwards while capturing images. The mobile phone (103) may capture images of the user (101) and the surroundings of the user (101). The mobile phone (103) may process the images to determine a position of the user (101) with respect to surroundings. In an embodiment, the mobile phone (103) may detect one or more objects (square boxes in FIG. 9) using image processing techniques as discussed above, and detect a steep depth behind the user. The mobile phone (103) may generate an alert to the user indicating about the depth behind the user (101) and to halt the movement of the user (101).

In an embodiment, the present disclosure discloses early prediction of the threat and alerting the user (101). The present disclosure further discloses alerting the user accurately based on the detected objects. Due to the use of FPN, the present disclosure discloses faster and accurate object detection and generating alerts based on the detected objects.

In light of the above mentioned advantages and the technical advancements provided by the disclosed method and system, the claimed steps as discussed above are not routine, conventional, or well understood in the art, as the claimed steps enable the solutions to the existing problems in conventional technologies. Further, the claimed steps clearly bring an improvement in the functioning of the device itself as the claimed steps provide a technical solution to a technical problem.

Figure 10:
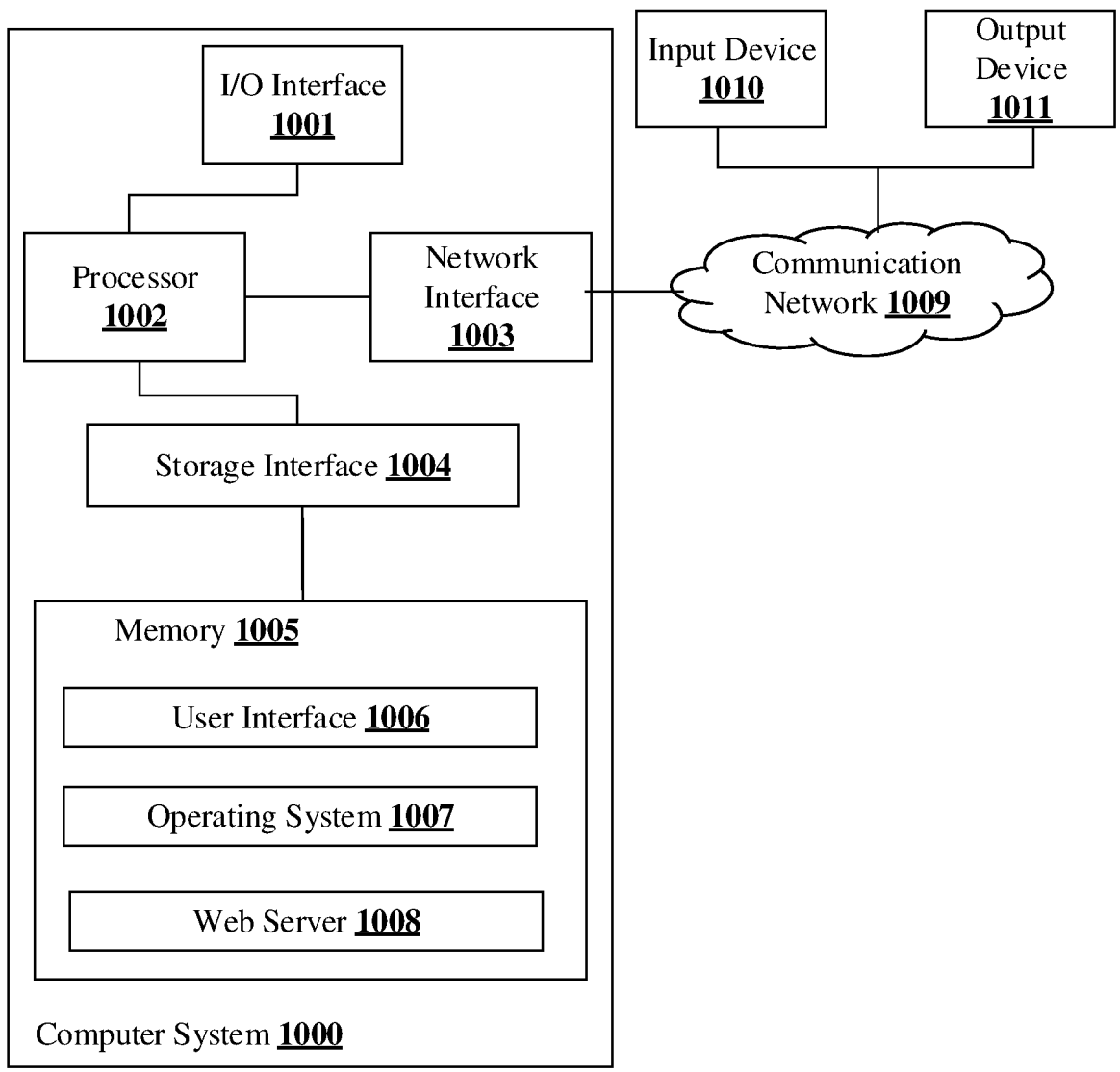
FIG. 10 shows a block diagram of a general-purpose computer system for alerting threats to users, in accordance with embodiments of the present disclosure.

FIG. 10 shows a block diagram of a general-purpose computer system for alerting threats to users.

FIG. 10 illustrates a block diagram of an exemplary computer system (1000) for implementing embodiments consistent with the present disclosure. In an embodiment, the computer system (1000) is used to implement generation of sentiment-based summary for user reviews. The computer system (1000) may comprise a central processing unit ("CPU" or "processor") (1002). The processor (1002) may comprise at least one data processor. The processor (1002) may include specialized processing units such as integrated system (bus) controllers, memory management control units, floating point units, graphics processing units, digital signal processing units, etc.

The processor (1002) may be disposed in communication with one or more input/output (I/O) devices (not shown) via I/O interface (1001). The I/O interface (1001) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 1002.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (1001), the computer system (1000) may communicate with one or more I/O devices. For example, the input device (1010) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (1011) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor (1002) may be disposed in communication with the communication network (1009) via a network interface (1003). The network interface (1003) may communicate with the communication network (1009). The network interface (1003) may employ connection protocols including, without limitation, direct connect, Ethernet (e.g., twisted pair 10/100/1000 Base T), transmission control protocol/internet protocol (TCP/IP), token ring, IEEE 1002.11a/b/g/n/x, etc. The communication network (1009) may include, without limitation, a direct interconnection, local area network (LAN), wide area network (WAN), wireless network (e.g., using Wireless Application Protocol), the Internet, etc. Using the network interface (1003) and the communication network (1009), the computer system (1000) may communicate with the scene remote devices (1012). The network interface (1003) may employ connection protocols include, but not limited to, direct connect, Ethernet (e.g., twisted pair 10/100/1000 Base T), transmission control protocol/internet protocol (TCP/IP), token ring, IEEE 1002.11a/b/g/n/x, etc.

The communication network (1009) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor (1002) may be disposed in communication with a memory (1005) (e.g., RAM, ROM, etc. not shown in FIG. 6) via a storage interface (1004). The storage interface (1004) may connect to memory (1005) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (1005) may store a collection of program or database components, including, without limitation, user interface (1006), an operating system (1007), web server (1008) etc. In some embodiments, computer system (1000) may store user/application data (1006), such as, the data, variables, records, etc., as described in this disclosure. Such databases may be implemented as fault-tolerant, relational, scalable, secure databases such as Oracle® or Sybase®.

The operating system (1007) may facilitate resource management and operation of the computer system (1000). Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACK-BERRY® OS, or the like.

In some embodiments, the computer system (1000) may implement a web browser (1008) stored program component. The web browser (1008) may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers (1008) may utilize facilities such as AJAX™, DHTML™, ADOBE® FLASH™, JAVASCRIPT™, JAVA™, Application Programming Interfaces (APIs), etc. In some embodiments, the computer system (1000) may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system (1000) may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method of alerting threats to user of a mobile phone, comprising:
    receiving, by the mobile phone associated with the user, a plurality of signals comprising at least one of Electro-Magnetic (E-M) signals and sound signals, from one or more sensors associated with the mobile phone, wherein the plurality signals are related to images and sound signals of an environment around the user;
    detecting and classifying, by the mobile phone, one or more objects around the user by applying Convolution Neural Network (CNN) for the images and sound signals,
    wherein (i) Long Short-Term Memory (LSTM) is used to determine the objects using sound signals, and
    wherein (ii) Feature Pyramid Network (FPN) is used to identify the one or more objects by: generating image pyramids using bottom-up approach and top-down approach, and
        wherein (a) in the bottom-up approach: the spatial resolution decreases whereas semantics of features increases, and (b) in the top-down approach: the spatial resolution increases whereas the semantics of the features decrease;
    predicting, by the electronic gadget, a threat to the user caused by the one or more objects around the user based on at least one of, one or more rules and an Artificial Model (AI) model; and generating, by the electronic gadget, one or more alerts based on the predicted threat posed by the one or more objects, wherein the one or more alerts are provided to the user to enable the user to avoid the threat.

2. The method as claimed in claim 1, wherein the plurality of signals are time series data.

3. The method as claimed in claim 1, further comprises classifying the one or more objects into one or more categories using a CNN classifier.

4. The method as claimed in claim 1, further comprises:
determining a temporal difference in the time series data;
determining a variation in a relative position of the user with respect to the one or more objects in the environment using the temporal difference in the time series data; and
estimating an impact caused by the one or more objects to the user based on the variation in the relative position of the user with respect to the one or more objects and the one or more categories of the one or more objects, wherein the estimated impact is used to predict the threat to the user.

5. The method as claimed in claim 1, wherein the AI model is trained to determine a threat, wherein training the AI model comprises:
providing the one or more rules and a plurality of training signals as input to the AI model, wherein each of the plurality of signals are associated with a threat based on the one or more rules;
providing a plurality of testing signals after training the AI model; and
evaluating a threat output by the AI model for the provided plurality of testing signals, based on the one or more rules, wherein evaluating comprises at least one of adjusting one of, one or more weights associated with the one or more rules and a bias of the AI model.

6. The method as claimed in claim 1, wherein generating the one or more alerts comprises:
determining simultaneously when the one or more objects are detected, historical alerts that were generated when historical objects similar to the one or more objects were detected;
generating the one or more alerts based on the determined historical alerts and the detected one or more objects, wherein the one or more alerts are provided to the user to caution the user of a possible threat; and
updating the one or more alerts based on the predicted threat to the user, wherein the updated one or more alerts are provided to the user to enable the user to avoid the threat.

7. The method as claimed in claim 1, wherein the one or more alerts are generated further based on a severity of the threat, wherein the severity of the threat is determined based on the one or more categories of the one or more objects and an estimated impact caused by the one or more objects to the user based on the variation in the relative position of the user with respect to the one or more objects.

8. A mobile phone for alerting threats to users, comprising:
a processor; and
a memory, communicatively connected to the processor, storing processor executable instructions, which, in execution causes the processor to:
receive a plurality of signals comprising at least one of Electro-Magnetic (E-M) signals and sound signals, from one or more sensors associated with the mobile phone, wherein the plurality signals are related to images and sound signals of an environment around the user;
detect and classify one or more objects around the user by applying Convolution Neural Network (CNN) for the images and sound signals,
wherein (i) Long Short-Term Memory (LSTM) is used to determine the objects using sound signals, and
wherein (ii) Feature Pyramid Network (FPN) is used to identify the one or more objects by: generating image pyramids using bottom-up approach and top-down approach, and
wherein (a) in the bottom-up approach: the spatial resolution decreases whereas semantics of features increases, and (b) in the top-down approach: the spatial resolution increases whereas the semantics of the features decrease;
predict a threat to the user caused by the one or more objects around the user based on at least one of, one or more rules and an Artificial Model (AI) model; and
generate one or more alerts based on the predicted threat posed by the one or more objects, wherein the one or more alerts are provided to the user to enable the user to avoid the threat.

9. The mobile phone as claimed in claim 8, wherein the processor receives the plurality of signals as time series data.

10. The mobile phone as claimed in claim 8, wherein the processor is further configured to classify the one or more objects into one or more categories using a CNN classifier.

11. The mobile phone as claimed in claim 8, wherein the processor is further configured to:
determine a temporal difference in time series data;
determine a variation in a relative position of the user with respect to the one or more objects in the environment using the temporal difference in the time series data; and
estimate an impact caused by the one or more objects to the user based on the variation in the relative position of the user with respect to the one or more objects and the one or more categories of the one or more objects, wherein the estimated impact is used to predict the threat to the user.

12. The mobile phone as claimed in claim 8, wherein the processor is configured to train AI model is to determine a threat, wherein processor is configured to:
provide the one or more rules and a plurality of training signals as input to the AI model, wherein each of the plurality of signals are associated with a threat based on the one or more rules;
provide a plurality of testing signals after training the AI model; and
evaluate a threat output by the AI model for the provided plurality of testing signals, based on the one or more rules, wherein evaluating comprises at least one of adjusting one of, one or more weights associated with the one or more rules and a bias of the AI model.

13. The mobile phone as claimed in claim 8, wherein the processor generates the one or more alerts, wherein the processor is configured to:
determine simultaneously when the one or more objects are detected, historical alerts that were generated when historical objects similar to the one or more objects were detected;
generate the one or more alerts based on the determined historical alerts and the detected one or more objects, wherein the one or more alerts are provided to the user to caution the user of a possible threat; and update the one or more alerts based on the predicted threat to the user, wherein the updated one or more alerts are provided to the user to enable the user to avoid the threat.

14. The mobile phone as claimed in claim 8, wherein the processor generates the one or more alerts further based on a severity of the threat, wherein the severity of the threat is determined based on the one or more categories of the one or more objects and an estimated impact caused by the one or more objects to the user based on the variation in the relative position of the user with respect to the one or more objects.

15. The mobile phone as claimed in claim 8, further comprises a user interface to provide the one or more alerts to the user.

16. A non-transitory computer readable medium including instructions stored thereon that when processed by at least one processor cause a a mobile phone to perform operations comprising:

receiving a plurality of signals comprising at least one of Electro-Magnetic (E-M) signals and sound signals, from one or more sensors associated with the apparatus mobile phone, wherein the plurality signals are related to images and sound signals of an environment around the user;

detecting and classifying one or more objects around the user by applying Convolution Neural Network (CNN) for the images and sound signals, wherein (i) Long Short-Term Memory (LSTM) is used to determine the objects using sound signals, and wherein (ii) Feature Pyramid Network (FPN) is used to identify the one or more objects by: generating image pyramids using bottom-up approach and top-down approach, and wherein (a) in the bottom-up approach: the spatial resolution decreases whereas semantics of features increases, and (b) in the top-down approach: the spatial resolution increases whereas the semantics of the features decrease;

predicting a threat to the user caused by the one or more objects around the user based on at least one of, one or more rules and an Artificial Model (AI) model; and generating one or more alerts based on the predicted threat posed by the one or more objects, wherein the one or more alerts are provided to the user to enable the user to avoid the threat.

* * * * *